US012036520B2

(12) United States Patent
Vellaiah Retnaswamy

(10) Patent No.: US 12,036,520 B2
(45) Date of Patent: Jul. 16, 2024

(54) APPARATUS FOR DISPERSING PARTICLES IN A LIQUID

(71) Applicant: ALFA LAVAL CORPORATE AB, Lund (SE)

(72) Inventor: Ashok Vellaiah Retnaswamy, Humble, TX (US)

(73) Assignee: ALFA LAVAL CORPORATE AB, Lund (SE)

( * ) Notice: Subject to any disclaimer, the term of this patent is extended or adjusted under 35 U.S.C. 154(b) by 0 days.

(21) Appl. No.: 17/089,410

(22) Filed: Nov. 4, 2020

(65) Prior Publication Data

US 2021/0046434 A1 Feb. 18, 2021

Related U.S. Application Data

(60) Division of application No. 15/713,030, filed on Sep. 22, 2017, now Pat. No. 10,857,507, which is a (Continued)

(51) Int. Cl.
*B01F 25/20* (2022.01)
*B01F 25/23* (2022.01)

(Continued)

(52) U.S. Cl.
CPC .............. *B01F 25/28* (2022.01); *B01F 25/23* (2022.01); *B01F 25/27* (2022.01);

(Continued)

(58) Field of Classification Search
CPC .......... B01F 25/28; B01F 25/23; B01F 25/27; B01F 25/432; B01F 25/46; B01F 33/813;

(Continued)

(56) References Cited

U.S. PATENT DOCUMENTS

| | | | |
|---|---|---|---|
| 1,845,969 | A | 2/1932 | Hueber |
| 2,235,258 | A | 3/1941 | Jones |

(Continued)

FOREIGN PATENT DOCUMENTS

| | | | |
|---|---|---|---|
| CN | 1918575 | A | 2/2007 |
| CN | 100386153 | C | 5/2008 |

(Continued)

OTHER PUBLICATIONS

Chinese Office Action dated Apr. 20, 2021 for Application No. 201780019462.X.

(Continued)

*Primary Examiner* — Charles Cooley
(74) *Attorney, Agent, or Firm* — Patterson + Sheridan, LLP

(57) ABSTRACT

In one example, a liquid mixture nozzle for flowing a liquid mixture therethrough includes a body having a flow inlet and a flow outlet. The flow inlet is configured to couple to a first piece of piping and the flow outlet is configured to couple to a second piece of piping. The liquid mixture nozzle also includes a converging section having a decreasing diameter positioned adjacent the flow inlet, an orifice positioned at a narrow end of the converging section, an intermediate section having a constant diameter positioned adjacent the orifice, a diverging section having an increasing diameter positioned adjacent the intermediate section and the flow outlet.

14 Claims, 4 Drawing Sheets

Related U.S. Application Data continuation-in-part of application No. 15/078,551, filed on Mar. 23, 2016, now Pat. No. 9,950,328.

(51) Int. Cl.

| | |
|---|---|
| ***B01F 25/27*** | (2022.01) |
| ***B01F 25/312*** | (2022.01) |
| ***B01F 25/432*** | (2022.01) |
| ***B01F 25/433*** | (2022.01) |
| ***B01F 25/46*** | (2022.01) |
| ***B01F 33/81*** | (2022.01) |
| ***B01F 35/221*** | (2022.01) |
| ***B05B 1/02*** | (2006.01) |
| ***B05B 1/26*** | (2006.01) |
| ***B05B 7/08*** | (2006.01) |
| ***B05B 7/14*** | (2006.01) |
| ***B05B 12/08*** | (2006.01) |
| ***B05B 15/20*** | (2018.01) |
| ***B05B 15/65*** | (2018.01) |
| ***E21B 21/06*** | (2006.01) |

(52) U.S. Cl.

CPC .... *B01F 25/312512* (2022.01); *B01F 25/432* (2022.01); *B01F 25/4335* (2022.01); *B01F 25/46* (2022.01); *B01F 33/813* (2022.01); *B01F 35/2211* (2022.01); *B01F 35/2213* (2022.01); *B05B 1/02* (2013.01); *B05B 1/26* (2013.01); *B05B 7/0846* (2013.01); *B05B 7/1481* (2013.01); *B05B 12/08* (2013.01); *B05B 15/20* (2018.02); *B05B 15/65* (2018.02); *E21B 21/062* (2013.01)

(58) Field of Classification Search

CPC .............. B01F 35/2211; B01F 35/2213; B01F 25/30–25/32; B01F 25/31251; B01F 25/312512; B01F 25/31252; B01F 25/312522; B01F 25/3125; B01F 25/4335; B01F 25/4337; B01F 25/4338; B05B 1/02; B05B 1/26; B05B 7/0846; B05B 7/1481; B05B 12/08; B05B 15/20; B05B 15/65; E21B 21/062

USPC ........................................................ 366/163.2

See application file for complete search history.

(56) References Cited

U.S. PATENT DOCUMENTS

| | | | | |
|---|---|---|---|---|
| 2,361,980 | A | 11/1944 | Tirrell | |
| 2,563,002 | A * | 8/1951 | Bissell | B01F 25/3142 137/888 |
| 2,719,704 | A | 10/1955 | Anderson et al. | |
| 2,770,501 | A | 11/1956 | Coanda | |
| 2,785,926 | A | 3/1957 | Lataste | |
| 2,965,312 | A | 12/1960 | Hale | |
| 3,272,441 | A | 9/1966 | Davis, Sr. et al. | |
| 3,799,195 | A * | 3/1974 | Hermans | F23D 14/60 137/553 |
| 3,819,157 | A * | 6/1974 | Markfelt | B01F 35/711 366/101 |
| 3,833,718 | A | 9/1974 | Reed et al. | |
| 3,840,183 | A | 10/1974 | Kuribayashi | |
| 3,849,057 | A | 11/1974 | Peck et al. | |
| 3,881,656 | A * | 5/1975 | Markfelt | B01F 25/311 239/428 |
| 4,123,800 | A * | 10/1978 | Mazzei | B01F 25/4336 366/181.5 |
| 4,210,166 | A * | 7/1980 | Munie | B01F 25/4335 137/271 |
| 4,308,138 | A | 12/1981 | Woltman | |
| 4,324,365 | A | 4/1982 | Howarth | |
| 4,334,783 | A * | 6/1982 | Suzaka | B01F 25/4521 366/341 |
| 4,415,123 | A | 11/1983 | Ikeuchi | |
| 4,664,147 | A | 5/1987 | Maddock | |
| 4,783,008 | A | 11/1988 | Ikeuchi et al. | |
| 4,909,914 | A | 3/1990 | Chiba et al. | |
| 5,037,616 | A | 8/1991 | Williatte et al. | |
| 5,073,309 | A | 12/1991 | Bousquet et al. | |
| 5,080,286 | A | 1/1992 | Morrison | |
| 5,082,633 | A | 1/1992 | Stuper | |
| 5,445,226 | A | 8/1995 | Scott et al. | |
| 5,466,063 | A * | 11/1995 | Poyet | B01F 25/3132 366/159.1 |
| 5,613,773 | A | 3/1997 | Scott et al. | |
| 5,664,733 | A | 9/1997 | Lott | |
| 5,674,312 | A | 10/1997 | Mazzei | |
| 5,676,173 | A | 10/1997 | Conrad et al. | |
| 5,693,226 | A | 12/1997 | Kool | |
| 5,779,355 | A * | 7/1998 | Pullman | B01F 23/50 366/173.2 |
| 5,810,252 | A | 9/1998 | Pennamen et al. | |
| 5,863,128 | A | 1/1999 | Mazzei | |
| 5,890,661 | A | 4/1999 | Crampton et al. | |
| 5,920,925 | A | 7/1999 | Dongo | |
| 5,927,852 | A | 7/1999 | Serafin | |
| 5,964,418 | A | 10/1999 | Scarpa et al. | |
| 6,003,789 | A * | 12/1999 | Base | B01J 19/26 239/398 |
| 6,056,634 | A * | 5/2000 | Schwarz | A23L 13/60 366/337 |
| 6,076,750 | A | 6/2000 | Mykkanen et al. | |
| 6,082,713 | A * | 7/2000 | King | B01F 25/433 261/79.2 |
| 6,088,934 | A | 7/2000 | Newton | |
| 6,113,013 | A | 9/2000 | Sand | |
| 6,158,471 | A | 12/2000 | Greif et al. | |
| 6,173,526 | B1 | 1/2001 | Mazzei | |
| 6,234,664 | B1 | 5/2001 | Tromley | |
| 6,322,008 | B1 | 11/2001 | Aker et al. | |
| 6,502,767 | B2 | 1/2003 | Kay et al. | |
| 6,623,154 | B1 | 9/2003 | Garcia | |
| 6,722,584 | B2 | 4/2004 | Kay et al. | |
| 6,730,214 | B2 | 5/2004 | Mazzei | |
| 6,814,150 | B2 | 11/2004 | Clauss et al. | |
| 7,219,849 | B1 | 5/2007 | Hedger | |
| 7,287,597 | B2 | 10/2007 | Shaposhnikov et al. | |
| 7,357,565 | B2 | 4/2008 | Gopalan et al. | |
| 7,401,973 | B1 | 7/2008 | Lott | |
| 7,563,019 | B2 | 7/2009 | Buchholz | |
| 7,618,182 | B1 | 11/2009 | Lott | |
| 7,621,463 | B2 | 11/2009 | Presz, Jr. et al. | |
| 7,621,466 | B2 | 11/2009 | Ko et al. | |
| 7,651,621 | B2 | 1/2010 | Kelsey et al. | |
| 7,779,864 | B2 | 8/2010 | Mazzei | |
| 7,926,502 | B1 | 4/2011 | Lott | |
| 8,016,215 | B1 | 9/2011 | Zhadanov et al. | |
| 8,313,717 | B2 | 11/2012 | Boe | |
| 8,408,479 | B2 | 4/2013 | Di Loreto | |
| 8,596,857 | B2 | 12/2013 | Bastesen | |
| 8,702,019 | B2 | 4/2014 | Chen et al. | |
| 8,814,532 | B2 | 8/2014 | Ogata et al. | |
| 8,845,178 | B2 * | 9/2014 | Hanada | B01F 25/31243 137/888 |
| 9,126,176 | B2 * | 9/2015 | Kravtsov | B01F 25/4521 |
| 9,168,498 | B2 | 10/2015 | Muller et al. | |
| 9,242,260 | B2 | 1/2016 | Stevenson et al. | |
| 9,382,922 | B2 * | 7/2016 | Dunning | F04F 5/44 |
| 9,950,328 | B2 * | 4/2018 | Vellaiah Retnaswamy | B01F 35/2211 |
| 10,151,283 | B2 | 12/2018 | Graichen et al. | |
| 10,266,436 | B2 | 4/2019 | Whitmore, Sr. et al. | |
| 10,857,507 | B2 * | 12/2020 | Vellaiah Retnaswamy | B01F 35/2211 |
| 2004/0251566 | A1 * | 12/2004 | Kozyuk | B01F 25/4335 261/76 |
| 2005/0040260 | A1 | 2/2005 | Zhao et al. | |
| 2005/0133615 | A1 | 6/2005 | Gopalan et al. | |
| 2005/0161532 | A1 | 7/2005 | Steenkiste et al. | |

(56) References Cited

U.S. PATENT DOCUMENTS

| | | | | |
|---|---|---|---|---|
| 2006/0109738 | A1 | 5/2006 | Buchholz | |
| 2007/0057083 | A1 | 3/2007 | Bolz | |
| 2007/0153625 | A1* | 7/2007 | Lundgren | B01F 23/451 366/144 |
| 2008/0001007 | A1 | 1/2008 | Gilpatrick et al. | |
| 2008/0048048 | A1 | 2/2008 | Noestheden | |
| 2008/0094936 | A1 | 4/2008 | Corti | |
| 2010/0151540 | A1* | 6/2010 | Gordon | B01F 25/4336 435/134 |
| 2010/0258654 | A1 | 10/2010 | Peterson et al. | |
| 2011/0003370 | A1* | 1/2011 | Gordon | B01F 25/4336 204/158.21 |
| 2011/0168640 | A1* | 7/2011 | Gilmour | B03D 1/247 210/703 |
| 2011/0236227 | A1 | 9/2011 | Ogata et al. | |
| 2011/0277379 | A1 | 11/2011 | Bortkevitch et al. | |
| 2012/0103546 | A1* | 5/2012 | Maniere | B01F 25/31243 106/206.1 |
| 2012/0206993 | A1* | 8/2012 | Casper | B01F 23/2319 366/163.2 |
| 2012/0307588 | A1* | 12/2012 | Hanada | B01F 25/312 366/336 |
| 2013/0068852 | A1 | 3/2013 | Wurz et al. | |
| 2013/0294189 | A1 | 11/2013 | Myrick et al. | |
| 2014/0301157 | A1* | 10/2014 | Glanville | B01F 25/4335 366/337 |
| 2014/0363855 | A1* | 12/2014 | Gordon | A23K 50/10 435/155 |
| 2015/0298075 | A1* | 10/2015 | Glanville | B01F 25/4315 366/338 |
| 2015/0366127 | A1 | 12/2015 | Roberge et al. | |
| 2017/0232407 | A1* | 8/2017 | Cobb | B01F 23/451 166/312 |
| 2017/0274398 | A1* | 9/2017 | Vellaiah Retnaswamy | B05B 1/02 |
| 2018/0008941 | A1* | 1/2018 | Vellaiah Retnaswamy | B01F 25/27 |
| 2019/0024491 | A1 | 1/2019 | Fielder et al. | |
| 2019/0275476 | A1* | 9/2019 | Talamantez | B01F 25/312 |
| 2020/0290040 | A1* | 9/2020 | Molla | B01F 35/2113 |
| 2021/0213400 | A1* | 7/2021 | Asano | B01F 23/2373 |
| 2021/0379544 | A1* | 12/2021 | Asano | B01F 25/21 |

FOREIGN PATENT DOCUMENTS

| | | | | |
|---|---|---|---|---|
| CN | 201161168 | U | 12/2008 | |
| CN | 101835561 | A | 9/2010 | |
| CN | 102958595 | A | 3/2013 | |
| CN | 203408644 | U | 1/2014 | |
| CN | 203874686 | U | 10/2014 | |
| CN | 205146011 | U | 4/2016 | |
| DE | 1689819 | U | 12/1954 | |
| DE | 3619857 | C2 | 5/1989 | |
| DE | 19536845 | A1 | 4/1997 | |
| DE | 20306915 | U1 | 8/2003 | |
| DE | 202008002762 | U1 * | 6/2008 | A23L 2/54 |
| GB | 377864 | A * | 8/1932 | |
| GB | 543995 | A | 3/1942 | |
| GB | 949954 | A | 2/1964 | |
| WO | 96/14941 | A1 | 5/1996 | |
| WO | WO-9730292 | A1 * | 8/1997 | B01F 3/0811 |
| WO | 0050162 | A1 | 8/2000 | |
| WO | 2006125191 | A2 | 11/2006 | |
| WO | 2008023252 | A2 | 2/2008 | |
| WO | 2008058548 | A1 | 5/2008 | |
| WO | WO-2011012186 | A2 * | 2/2011 | B01F 3/0807 |
| WO | 2013165473 | A1 | 11/2013 | |
| WO | WO-2014084301 | A1 * | 6/2014 | B01F 3/04503 |
| WO | 2017162449 | A1 | 9/2017 | |

OTHER PUBLICATIONS

Gongye, Yejin et al., "Metallurgical Industry Energy Conservation Monitoring", Metallurgical Industry Press, Oct. 31, 1996, First Edition.

Non-Final Office Action dated Mar. 7, 2019 for U.S. Appl. No. 15/713,030.

Final Office Action dated Aug. 15, 2019 for U.S. Appl. No. 15/713,030.

Non-Final Office Action dated Jan. 8, 2020 for U.S. Appl. No. 15/713,030.

International Search Report dated Aug. 24, 2018 for Application No. PCT/US2017/052966.

Communication dated Jun. 13, 2017 issued by the European Patent Office in corresponding International Application No. PCT/EP2017/055698 (14 pages).

Final Office Action dated Aug. 24, 2017 for U.S. Appl. No. 15/078,551.

Non-Final Office Action dated Apr. 27, 2017 for U.S. Appl. No. 15/078,551.

International Search Report dated Mar. 3, 2017 for Application No. PCT/EP2017/055698.

Search Report dated Jun. 19, 2018 for Application No. PCT/US2017/052966.

Chinese Office Action dated Sep. 10, 2020 for Application No. 201780019462.X.

* cited by examiner

APPARATUS FOR DISPERSING PARTICLES IN A LIQUID

CROSS-REFERENCE TO RELATED APPLICATIONS

This application is a divisional of U.S. patent application Ser. No. 15/713,030, filed Sep. 22, 2017, which is a continuation-in-part of U.S. patent application Ser. No. 15/078,551, filed Mar. 23, 2016, each of which are herein incorporated by reference.

TECHNICAL FIELD

Aspects of the disclosure relate to apparatuses and methods for dispersing particles in a liquid.

BACKGROUND ART

Within the oil and gas industry, there are certain needs for mixing particles within a liquid, such as drilling mud. The purpose of the mixing is to achieve homogenization and dispersion of particles in the liquid. A number of technologies for obtaining mixing are used, including rotating shear units, conventional stirring techniques, and vibration based techniques. The mixing is performed in one or more stages and is typically effected in one or more shearing zones where liquid undergoes “shear”, which happens when liquid travels with a different velocity relative to an adjacent area or liquid volume.

One example of a mixer type is shown in patent document U.S. Pat. No. 3,833,718 which describes a so called jet mixer. This mixer is used for providing high shear mixing of liquid such as in the preparation of slurry solutions for well treating. The mixing principle is based on forming a shear zone at the confluence of opposing streams of a mixture of liquid and particles. The mixer is based on separating the liquid into two streams and then directing the streams towards each other. The streams are directed into the mixing zone from a location substantially at right angles to each other to cause mixing.

The described mixer seems to provide adequate mixing. However, it is estimated that the mixing of conventional mixers may be further improved.

SUMMARY

In one example, a liquid mixture nozzle for flowing a liquid mixture therethrough, comprises a body having a flow inlet and a flow outlet. The flow inlet is configured to couple to a first piece of piping and the flow outlet is configured to couple to a second piece of piping. The liquid mixture nozzle also includes a converging section having a decreasing diameter positioned adjacent the flow inlet, an orifice positioned at a narrow end of the converging section, an intermediate section having a constant diameter positioned adjacent the orifice, a diverging section having an increasing diameter positioned adjacent the intermediate section and the flow outlet.

In another example, a flow system comprises a flow inlet pipe, a flow outlet pipe, and a first liquid mixture nozzle connected to the flow inlet pipe at an upstream end of the liquid mixture nozzle, and connected to the flow outlet pipe at a downstream end of the liquid mixture nozzle. The liquid mixture nozzle comprises a body having a flow inlet and a flow outlet, a converging section having a decreasing diameter positioned adjacent the flow inlet, an orifice positioned at a narrow end of the converging section, an intermediate section having a constant diameter positioned adjacent the converging section, and a diverging section having an increasing diameter positioned adjacent the intermediate section and the flow outlet.

In another example, a method for dispersing particles in drilling mud comprises flowing the drilling mud through a converging flow section to increase the velocity of the drilling mud, flowing the drilling mud through an orifice located downstream of the converging section, and flowing the drilling mud through a diverging section located downstream of the orifice, thereby generating turbulence within the drilling mud to enhance dispersion of particles within the drilling mud.

The apparatuses may include a number of different features as described below, alone or in combination. The apparatus that is used in the method may include the same features. Aspects and advantages of the embodiments described herein will appear from the following detailed description as well as from the drawings. It is contemplated that aspects described in one embodiment may be incorporated into other embodiments without further recitation.

BRIEF DESCRIPTION OF THE DRAWINGS

Embodiments of the disclosure will now be described, by way of example, with reference to the accompanying schematic drawings, in which.

DETAILED DESCRIPTION

Figure 1:
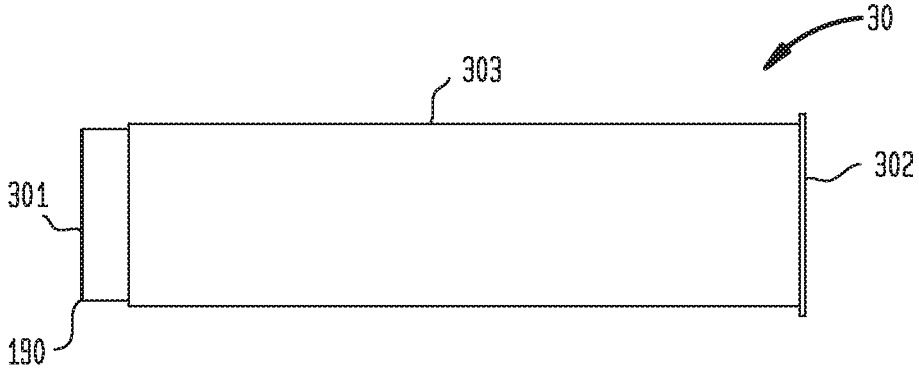
FIG. 1 is a side view of a nozzle according to one aspect of the disclosure.
Figure 2:
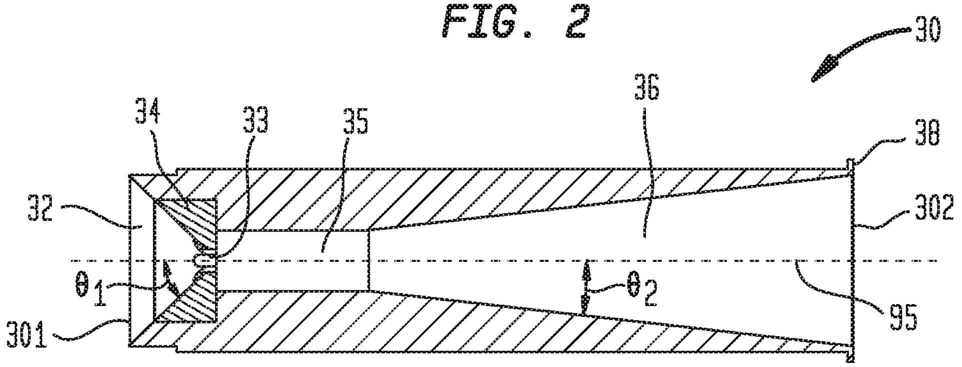
FIG. 2 is a cross-sectional side view of the nozzle of FIG. 1.

FIGS. 1-5 are various schematic views of a nozzle 30, according to aspects of the disclosure. With reference to FIGS. 1-5, the nozzle 30 includes a body defined by an elongated cylindrical surface 303. The nozzle 30 includes an inlet 301 into which a liquid stream flows, and an outlet 302 from which the liquid stream exits the first nozzle 30. An exemplary liquid mixture for flow through the nozzle 30 is drilling mud.

In geotechnical engineering, drilling mud is used to aid the drilling of boreholes into the Earth. The main functions of drilling mud include providing hydrostatic pressure to prevent formation fluids from entering into a well bore, keeping a drill bit cool and clean during drilling, carrying out drill cuttings, and suspending the drill cuttings while drilling is paused and when the drilling assembly is brought in and out of the hole. The drilling mud used for a particular job is selected to avoid formation damage and to limit corrosion. Water-based drilling mud most commonly consists of bentonite clay with additives such as barium sulfate (barite), calcium carbonate (chalk) or hematite.

In addition, various thickeners may be used to influence the viscosity of the drilling mud, e.g. xanthan gum, guar gum, glycol, carboxymethylcellulose, polyanionic cellulose (PAC), or starch. In turn, de-flocculants, such as anionic polyelectrolytes (e.g., acrylates, polyphosphate, lignosulfonates, or tannic acid) may be used to reduced viscosity, particularly when using clay-based muds. Other common additives include lubricants, shale inhibitors, and fluid loss additives (to control loss of drilling fluids into permeable formations).

Returning to the nozzle 30, to facilitate coupling with piping or other components, the first nozzle 30 also includes a circumferential flange 38 adjacent the outlet 302. Adjacent the flow inlet 301, the nozzle 30 has a reduced diameter section 190 for insertion into piping to facilitate coupling therewith. Alternatively, the positions of the flange 38 and the reduced diameter section 190 may be reversed, a flange may be utilized in place of the reduced diameter section 190, or a reduced diameter section may be utilized in place of the flange 38.

The nozzle 30 includes, in a liquid flow direction, a liquid converging section 32 at the inlet 301, an orifice 33, an intermediate flow section 35, and a diverging section 36. The liquid converging section 32 converges towards the orifice 33, e.g., the liquid converging section 32 has a cross-sectional area that decreases in a direction towards the orifice 33. Stated otherwise, the diameter of the converging section 32 decreases in a downstream direction. The converging section 32 may have a linear convergence or a curved convergence, or a combination thereof. The converging section 32 converges downward to an orifice 33, through which liquid travels.

The intermediate flow section 35 is located between the orifice 33 and the liquid diverging section 36. The intermediate flow section 35 has a constant cross-sectional area, e.g., a constant diameter. The intermediate flow section 35 may have a circular, elliptical, star or other suitable cross-sectional shape in a plane orthogonal to a central longitudinal axis of the intermediate flow section 35. The diverging section 36 is positioned adjacent to and downstream of the intermediate flow section 35. The diverging section 36 may have a linear divergence, a curved divergence, a combination thereof or another shape for the divergence. The diverging section 36 may also have a step wise divergence. In this context "diverging section" may be understood as a section with a cross-sectional area that increases in a direction of a flow of the liquid. A linear divergence or a slightly curved divergence may be utilized, since such a divergence gives an advantageous relationship between a liquid velocity and a pressure drop when a liquid passes through the nozzle 30.

In one example, a ratio of the cross sectional areas of the intermediate section 35 to a narrow end of the converging section 32 (e.g., the portion of the converging section 32 adjacent the orifice 33) is within a range of 2:1 to 6:1. Additionally or alternatively, the angle 1 between an axial centerline 95 of the nozzle 30 and a sidewall of the converging section 32 (e.g., the half angle) is within a range of about 30 degrees to about 50 degrees. Moreover, the angle 2 between the axial centerline 95 and a sidewall of the diverging section 36 (e.g., the half angle) is within a range of about 5 degrees to about 10 degrees. It is contemplated that the ratio between the half angle of the converging section to the half angle of the diverging section is about 3:1 to about 10:1. In one example, the axial centerline of each of the converging section 32, the orifice 33, the intermediate flow section 35, and the diverging section 36 is coaxial with the axial centerline 95. In one example, the length of the intermediate flow section 35 is equal to or greater than the outer diameter of the nozzle 30 or the outer diameter of a pipe coupled to the nozzle 30. For example, when using the nozzle 30 with a 6 inch diameter pipe, the intermediate flow section 35 of the nozzle 30 may be 6 inches or longer.

Figure 3:
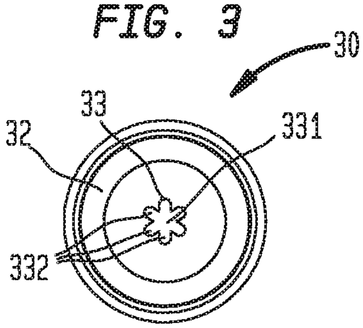
FIG. 3 is a front view of the nozzle of FIG. 1.
Figure 4:
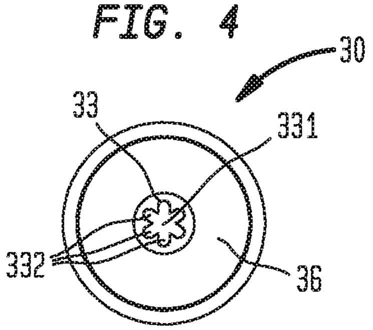
FIG. 4 is a rear view of the nozzle of FIG. 1.
Figure 5:
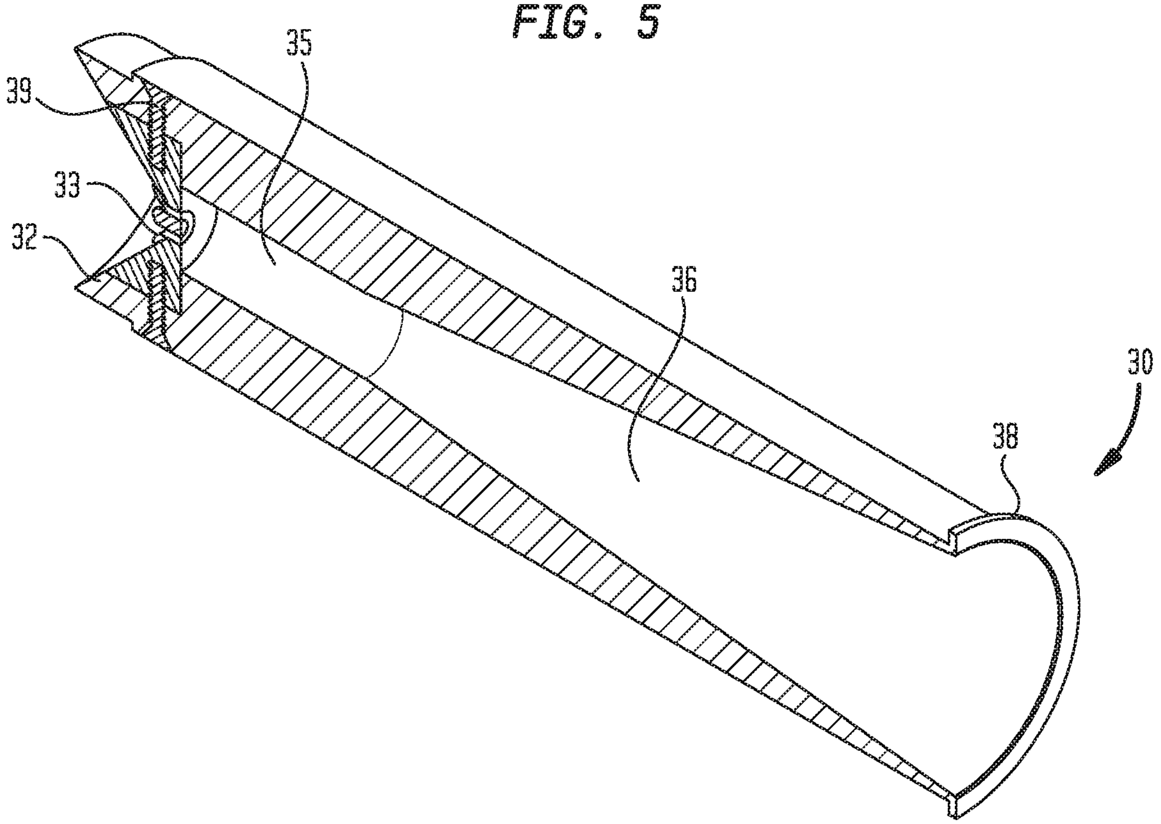
FIG. 5 is a cross-sectional perspective view of the nozzle of FIG. 1.

As may be seen in FIGS. 3 and 4, the orifice 33 may have a star-like shape with a central region 331 and a plurality of angularly spaced-apart, outer regions 332 around the periphery of the central region 331, such as the orifice of the Lobestar Mixing Nozzle®. The outer regions 332 provide, when a liquid flows through the outer regions 332, a vortex flow pattern that provides a shearing effect and thus improved dispersing of the particles in a liquid stream flowing through the nozzle 30. It is contemplated that other shapes may be used for the orifice 33, which in combination with one or more other aspects of the nozzle 30, facilitate a shearing effect and/or vortex generation to induce particle dispersion. In other examples, the orifice 33 may be circular, rectangular, elliptical, or another shape.

The orifice 33 may be formed in an orifice component 34 that is arranged in the nozzle 30. The orifice component 34 is fixed to the first nozzle 30 by a set of fasteners 39, and is removable from the nozzle 30. This allows the orifice component 34 to be replaced by another orifice component, for example, having an orifice 33 of different size or shape. The orifice component 34 may be omitted in the sense that the orifice 33 may be made as an integral part of the first nozzle 30. In one example, the nozzle 30 is made as one integral unit that includes the converging section 32, the orifice 33, the intermediate flow section 35 and the diverging section 36. In one example, the nozzle 30 is made of plastic. Additionally or alternatively, the orifice component 34 may be made from metal. For example, an orifice component 34 having a star-like shape formed therein may be formed from metal.

When a liquid stream flows through nozzle 30 via the nozzle inlet 301, the liquid stream experiences an increased flow velocity as the liquid stream passes through the converging section 32. The liquid stream is subjected to increased shear as the liquid stream passes through the orifice 33 and the intermediate flow section 35 at the increased velocity, thereby facilitating dispersion of particles within the liquid stream. As the liquid stream flows through the diverging section 32, the liquid stream experiences a sudden decrease in flow velocity that creates turbulence which increases the dispersion of particles in the liquid stream. Thus, both the converging section 32 and the diverging section 36 increase the dispersion of particles in the liquid stream.

Figure 6:
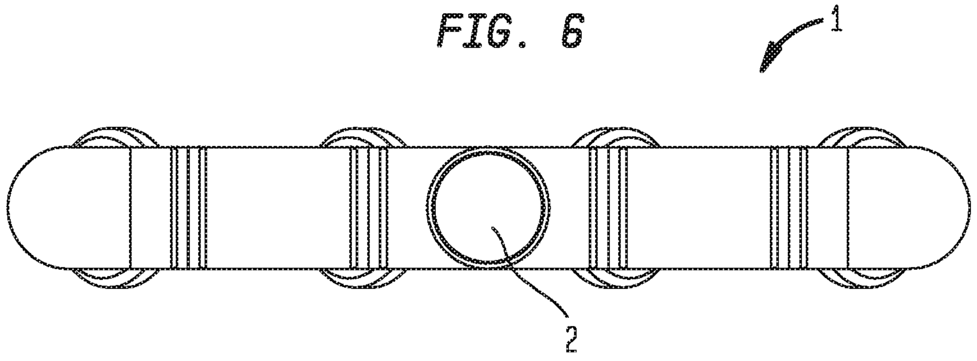
FIG. 6 is a rear view of an apparatus for dispersing particles in a liquid.
Figure 7:
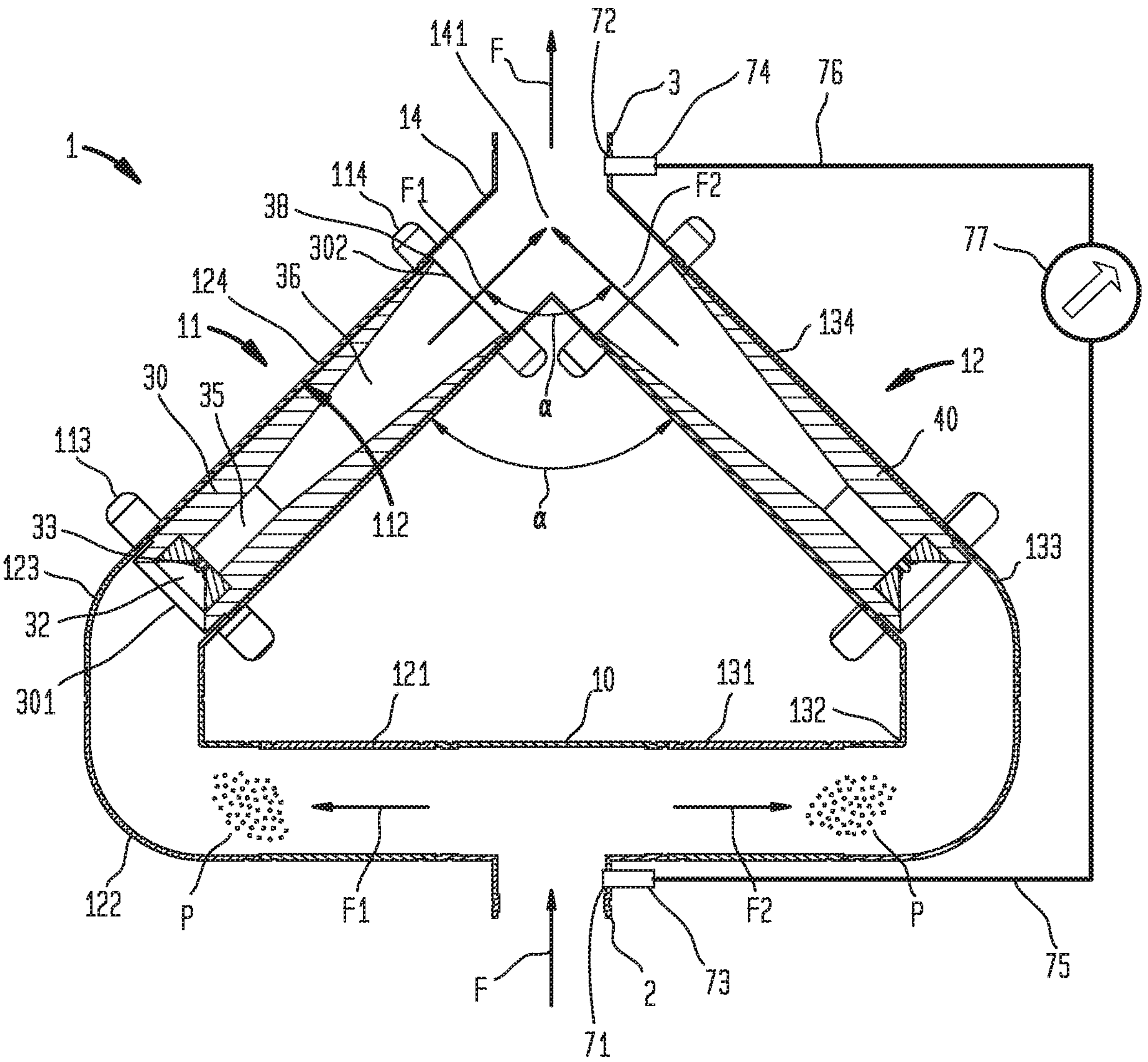
FIG. 7 is a cross-sectional top view of the apparatus of FIG. 6.

FIG. 6 is a rear view of an apparatus 1 for dispersing particles in a liquid. FIG. 7 is a cross-sectional top view of the apparatus of FIG. 6. The apparatus 1 utilizes a plurality of nozzles, described above, to facilitate mixing of particles in a liquid mixture, such as drilling mud.

The apparatus 1 is a flow system that has the principal form of a triangular piping component, with an inlet 2 at a center of the base of the triangle, and with an outlet 3 at the top of the triangle. Liquid F, such as drilling mud, includes particles P when the liquid enters the inlet 2. Once inside the apparatus 1, the particles P are dispersed in the liquid F, as will be described in detail below, before the liquid F leaves the apparatus 1 via the outlet 3. The particles P may to some extent be dispersed in the liquid F when the liquid F enters the apparatus 1, but as a result of flowing through the nozzles 30 within the apparatus 30, the particles within the liquid F become more evenly dispersed, thereby improving the rheology of the liquid F.

In detail, the apparatus 1 comprises a flow divider 10 in form of a T-section pipe where the inlet 2 is the base of the flow divider 10. Alternatively, a Y-section may be used as the flow divider 10. From the inlet 2 the flow divider 10 separates the liquid F into a first liquid stream F1 and a second liquid stream F2. The apparatus 1 has a first liquid branch 11 that is connected to the flow divider 10 for receiving the first liquid stream F1. A second liquid branch 12 is connected to the flow divider 10, on a side that is opposite the side where the first liquid branch 11 is connected. The second liquid branch 12 receives the second liquid stream F2.

The first liquid branch 11 comprises a straight section 121 that is connected to the flow divider 10, a 90° pipe elbow 122 that is connected to the straight section 121, an angled elbow 123 that is connected to the pipe elbow 122, and a second straight section 124 that is connected to the angled elbow 123. The angled elbow 123 is angled by half the angle α.

The second liquid branch 12 comprises a straight section 131 that is connected to the flow divider 10, at an opposite side of the flow divider 10 from where the straight section 121 of the first liquid branch 11 is connected. The second liquid branch 12 is similar to the first liquid branch 11 and has a 90° pipe elbow 132 that is connected to the straight section 131, an angled elbow 133 that is connected to the pipe elbow 132, and a second straight section 134 that is connected to the angled elbow 133. The angled elbow 133 is angled by half the angle α.

The second straight sections 124, 134 of the first liquid branch 11 and the second liquid branch 12 are connected to a branch joining section 14 that receives the first and second liquid streams F1, F2 from the first and second liquid branches 11, 12. The branch joining section 14 has the shape of a y-section pipe. The branch joining section 14 comprises the outlet 3 and the branch joining section 14 has an internal collision zone 141 where the first liquid stream F1 and the second liquid stream F2 meet and collide. When the liquid streams F1, F2 collide they undergo shear since the streams F1, F2 travel with a different velocity relative each other when they meet in the collision zone 141. Generally the velocities of the liquid streams F1. F2 are the same in terms of flow rate, but they have different directions which affects the shear. The collision zone 141 may also be referred to as a shearing zone.

The parts of the two liquid branches 11, 12 are typically made of metal, such as steel, and may be joined to each other by welding. However, the second straight sections 124, 134 of the two liquid branches 11, 12 are typically joined to their respective adjacent parts by two conventional clamps. For example, a first clamp 113 joins a first end of the second straight section 124 of the first liquid branch 11 to the angled elbow 123. A second clamp 114 joins the other end of the second straight section 124 of the first liquid branch 11 to the branch joining section 14. Two similar clamps join the second straight section 134 of the second liquid branch 12 in a similar manner to its adjacent angled elbow 133 and to the branch joining section 14. The clamps may have the form of any conventional clamps that are suitable for joining pipe components, and the sections 123, 124, 14, 134, 133 that are joined by the clamps are fitted with conventional flanges that are compatible with the clamp. By virtue of the clamps, it is possible for an operator to remove the second straight sections 124, 134 of the first and second liquid branches 11, 12.

The first liquid branch 11 and the second liquid branch 12 are arranged at an angle α of 60°-120° relative to one another to direct the first liquid stream F1 and the second liquid stream F2 towards each other at the corresponding angle α of 60°-120°. As a result the first liquid stream F1 and the second liquid stream F2 meet in the collision zone 141 by the same angle α of 60°-120°. The collision angle α between the liquid streams F1, F2 is accomplished by angling each of the angled elbows 123, 133 by half the angle α.

A first nozzle 30 is arranged in the first liquid branch 11 and a second nozzle 40 is arranged in the second liquid branch 12. The second nozzle 40 may incorporate the same features as the first nozzle 30, such that they are similar, or even identical. Thus, every feature that is described for the first nozzle 30 may also be implemented for the second nozzle 40. Each of the nozzles 30, 40 is removable from the liquid branch 11, 12 in which the nozzles 30, 40 are located. Removal of the nozzles 30, 40 is accomplished by releasing respective clamps from the second straight sections 124, 134. The nozzles 30, 40 are located in the second straight sections 124, 134 and by taking a nozzle 30, 40 out from a respective removed straight section, the nozzles 30, 40 may be removed or replaced.

The apparatus 1 has at the inlet 2 a first pressure sensing interface 71 and has at the outlet 3 a second pressure sensing interface 72. The pressure sensing interfaces 71, 72 may be openings to which pressure sensing device 77 is connected. The pressure sensing device 77 is a conventional differential pressure gauge and has a first pressure inlet port 73 and a second pressure inlet port 74 that are attached to the pressure sensing interfaces 71, 72, for example via two pressure conducting lines 75, 76. The differential pressure gauge performs the operation of pressure subtraction through mechanical means, which obviates the need for an operator or control system to determine the difference between the pressures at the pressure sensing interfaces 71, 72. Of course, any other suitable pressure sensing device may be used for determining the differential pressure.

The inclusion of a pressuring sensing device 77 facilitates the determination and monitoring of performance of the apparatus 1, i.e. the capability of the apparatus 1 to effectively disperse particles P in the liquid F. Specifically, the differential pressure across the apparatus 1 is indicative of the extent of shear (and thus particle dispersion) occurring in a liquid as the liquid travels through the apparatus 1, and more specifically, as the liquid travels through one or more nozzles 30. The differential pressure over the apparatus 1 is the difference between the pressure at a position near the inlet 2 and a pressure at a position near the outlet 3. For example, if the pressure at the inlet 2 equals 100 psi and if the pressure at the outlet 3 equals 60 psi, then the differential pressure is 40 psi (100 psi−60 psi).

During operation of the apparatus 1, the differential pressure is monitored and the flow rate of the liquid F is adjusted so as to obtain a predetermined differential pressure that is known to provide proper dispersion of the particles P in the liquid F. Exactly what the predetermined differential pressure should be may depend on a number of factors, such as the size of the apparatus 1, the type of the liquid F and the type of the particles, and is preferably empirically determined by adjusting the flow rate until the particle dispersion is satisfactory. The differential pressure that then can be read is then set as the predetermined differential pressure for the apparatus 1 and for the types of liquid F and particles P that were used.

The pressure sensing device 77 may not necessarily be a differential pressure gauge. The pressure sensing device 77 may also have the form of two conventional pressure meters that are connected to a respective pressure sensing interface 71, 72. These pressure meters then indicate, e.g. to an operator, the differential pressure over the apparatus since the operator may easily determine the differential pressure based on the readings form the pressure meters. It is also possible to indicate the differential pressure to a control system, for example by applying conventional electronic communication techniques. The control system can then adjust, in dependence of the measured pressure readings, i.e. in dependence of the differential pressure Δp, a flow of the liquid F with the particles P that are introduced in the inlet 2 of the apparatus 1.

Figure 8:
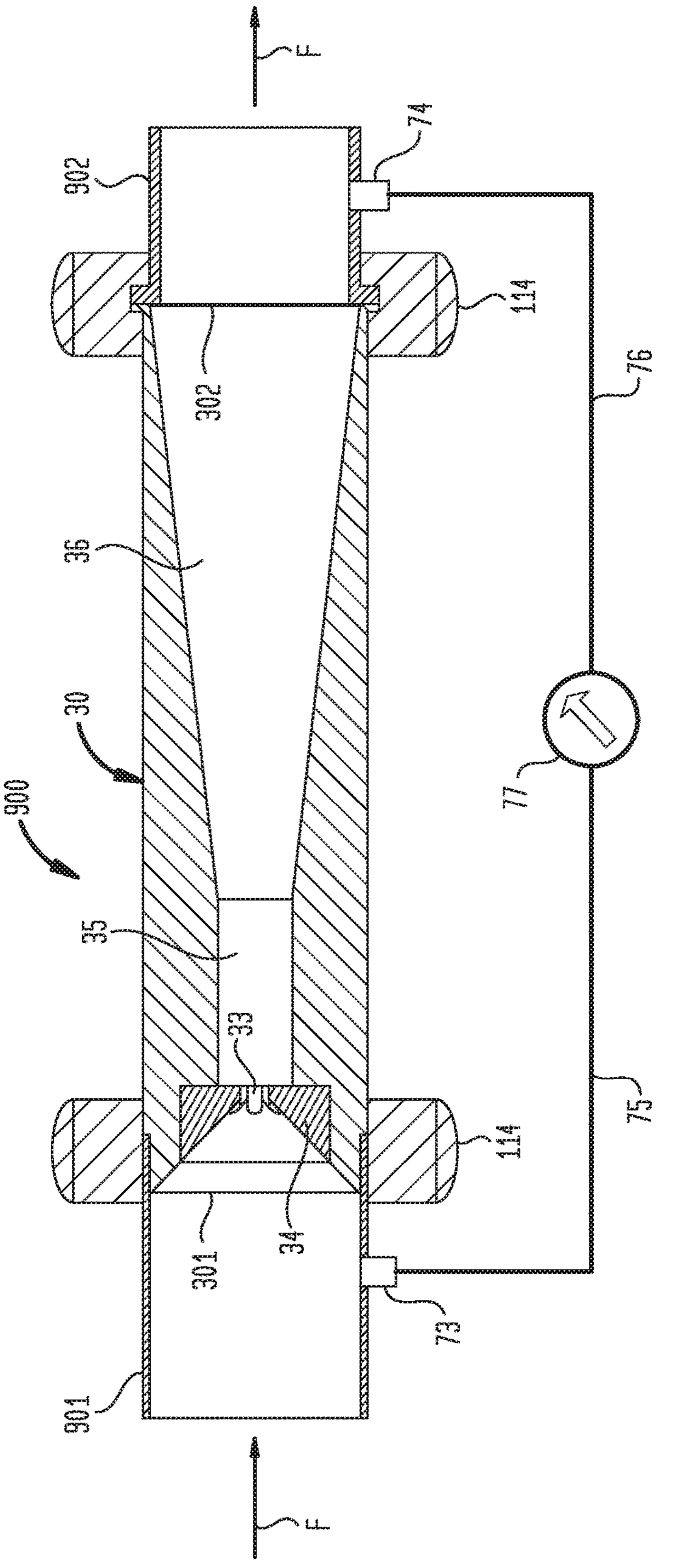
FIG. 8 is a schematic cross-sectional top view of an apparatus for dispersing particles, according to another embodiment of the disclosure.

FIG. 8 is a schematic cross-sectional top view of an apparatus 900 for dispersing particles, according to another embodiment of the disclosure. The apparatus 900 is a flow system that is similar to the apparatus 1, but includes only a single nozzle 30 and is arranged in a linear configuration with respect to incoming and outgoing liquid flow. Due to the linear configuration of the apparatus 900, the apparatus 900 occupies less space than apparatus 1. Thus, the apparatus 900 may be positioned in more space-constrained locations than apparatus 1. Moreover, because only a single nozzle 30 is utilized in the apparatus 900, compared to two nozzles 30 in the apparatus 1, manufacturing costs for apparatus 900 are less than the manufacturing costs of apparatus 1.

The apparatus 900 is coupled to a flow inlet pipe 901 and a flow outlet pipe 902 by clamps 114, and is arranged in a linear configuration with respect to the flow inlet pipe 901 and the flow outlet pipe 902. In one example, it is contemplated that any bends or turns in the flow inlet pipe 901 and the flow outlet pipe 902 are positioned a distance from the nozzle 30 that is four times, and preferably at least six times, the outer diameter of nozzle 30. However, other distances are also contemplated. The use of linear pipe adjacent the nozzle reduces erosion or wear on tees and elbows in the vicinity of the nozzle 30, particularly for components downstream of the nozzle 30. In addition, such lengths of linear pipe also allows turbulence from the nozzle 30 to subside to mitigate damage to pipelines due to excessive vibrations and pressure fluctuations.

The nozzle 30 of the apparatus 900 includes an inlet 301 into which the liquid stream F enters the nozzle 30, and a flow outlet 302 from which the liquid stream F leaves the first nozzle 30. A liquid converging section 32 is positioned downstream of the flow inlet 301 to converge liquid towards the orifice 33. An intermediate flow section 35 is located downstream of the orifice 33, between the orifice 33 and a liquid diverging section 36. The intermediate flow section 35 has a constant diameter. The liquid converging section 32 has a decreasing diameter in a direction towards the orifice 33, and the diverging section 36 has an increasing diameter in a direction towards the flow outlet 302. It is contemplated that the diameters of the orifice 33, the intermediate flow section 35, the converging section 32, and the diverging section 36 may be selected to permit a desired flow rate of liquid therethrough while maintaining a desired pressure drop between the flow inlet 301 and the flow outlet 302. To facilitate determination of the pressure drop, the apparatus 900 may include a pressure sensing device 77, a first pressure inlet port 73, a second pressure inlet port 74, and two pressure conducting lines 75, 76, as similarly described above.

During operation, as the liquid stream F travels through the converging section 32, the velocity of the liquid stream F is increased. The liquid stream F then travels through the orifice 33 and the intermediate flow section 35 at the increased velocity. Subsequently, the liquid stream F travels through the diverging section 36, resulting in a decreased flow rate. The increase in flow rate of the liquid stream F through the orifice 33 and the subsequent decrease in flow rate of the liquid stream F results in a vortex motion of the liquid stream F, as well as turbulence within the liquid stream F. The vortex motion and the turbulence results in mixing of the liquid stream F with the particles therein, thereby resulting in a more homogeneous mixture of particles within the liquid stream F. It is contemplated that a measured pressure drop, as described above, is indicative of velocity changes in the liquid, thereby indicating the extent of mixing in the liquid stream F.

It is contemplated that the apparatus 900 may be retrofitted to existing systems by placing the apparatus 900 inline in a desired piping assembly. For example, the nozzle 30 may be inserted into an existing pipeline via one or more circumferential flanges 38 and/or by mounting the nozzle using a reduced diameter section 190, as shown in FIG. 8. In another example, the nozzle 30 may be inserted into a section of piping, and held in place by a fastener, adhesive, or another manner. In some examples, it is contemplated that a single nozzle 30 is capable of mixing liquids and particles to nearly the same extent as the dual-nozzle configuration illustrated in FIG. 7. In such an example, the orifice 33 of the apparatus 900 is sized to have an area equal to the combined area of the orifices 33 within the nozzles 30, 40 of the apparatus 1, thus providing an equivalent throughput.

Figure 9:
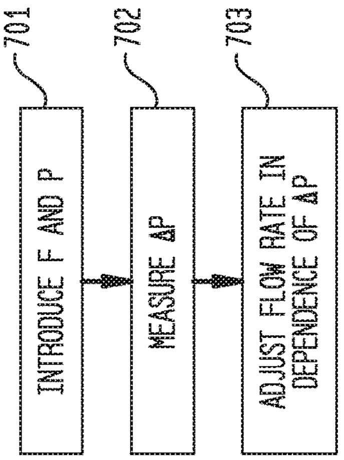
FIG. 9 is a schematic diagram of a method of dispersing particles in a liquid.

With reference to FIG. 9, a method of dispersing the particles P in the liquid F is illustrated. The method may be utilized with any of the above-described apparatuses. The method includes operation 701 in which the liquid F with particles P is introduced into the inlet of an above-described apparatus. Subsequently, in operation 702, a differential pressure Δp is measured as described above. In response to the measured pressure differential, a flow of the liquid F with the particles P is adjusted in operation 703. The adjustment in operation 703 is performed until a predetermined differential pressure Δp is obtained. In detail, the flow, or flow rate, of the liquid F with the particles P therein, may be adjusted in operation 703 by changing a speed of a pump that feeds the mixture of the liquid F and the particles P. A change in the pump speed changes the pressure at inlet of an apparatus, which in turn changes the flow (flow rate) of the liquid F through the apparatus 1. The flow may also be adjusted in operation 703 by throttling a valve that controls the flow of the liquid F having the particles P therein.

Benefits of the disclosed embodiments include improved mixing and dispersion of particles in a liquid mixture. The disclosed nozzle 30, apparatus 1, and apparatus 900 are particularly well-suited towards drilling mud rheology improvement and solids dispersion into a liquid, e.g., solid/liquid mixing. Conventionally, in the drilling industry, the rheology of the drilling mud is the key parameter used to determine quality. At the same time, storage of drilling mud in large tanks for long periods of time is common, which usually results in the deterioration of the rheology because the particle ingredients in the drilling mud—such as barite and bentonite powders, calcium carbonite, or hematite—tend to settle in the tank. However, flow and/or circulation of the drilling mud and particles therein through the disclosed apparatus improves the rheology of the mud without the need to add more powders, thereby reducing costs.

From the description above follows that, although various embodiments of the disclosure have been described and shown, the disclosure is not restricted thereto, but may also be embodied in other ways within the scope of the subject-matter defined in the following claims.

The invention claimed is:

1. A method for dispersing particles in a drilling mud, the method comprising:

flowing the drilling mud through a converging section of a liquid mixture nozzle to increase a velocity of the drilling mud, the liquid mixture nozzle comprising only a single inlet, only a single outlet, and a body defined by an elongated cylindrical surface extending between the single inlet and the single outlet;

flowing the drilling mud through an orifice of the liquid mixture nozzle, wherein the orifice is located immediately downstream of the converging section;

flowing the drilling mud through an intermediate section of the liquid mixture nozzle, the intermediate section having a constant diameter that is greater than a diameter of the orifice and less than a diameter of the converging section at the single inlet, and the intermediate section being positioned immediately downstream of and immediately adjacent to the orifice; and flowing the drilling mud through a diverging section of the liquid mixture nozzle, thereby generating turbulence within the drilling mud to enhance dispersing of particles within the drilling mud, wherein the diverging section is located downstream of the intermediate section.

2. The method of claim 1, further comprising:

measuring a first pressure of the drilling mud prior to flowing the drilling mud through the converging section;

measuring a second pressure of the drilling mud after flowing the drilling mud through the diverging section; and adjusting a flow rate of the drilling mud introduced to the converging section based on a difference between the second pressure and the first pressure.

3. The method of claim 2, wherein the adjusting the flow rate is conducted until a predetermined differential pressure is obtained.

4. The method of claim 3, wherein the flowing the drilling mud through the orifice comprises flowing the drilling mud through a narrow end of the converging section and into a first end of the intermediate section.

5. The method of claim 4, wherein the flowing the drilling mud through the diverging section comprises flowing the drilling mud through a second end of the intermediate section and into an end of the diverging section.

6. The method of claim 1, wherein the flowing the drilling mud through the converging section comprises flowing the drilling mud inwardly toward an axial centerline of the liquid mixture nozzle along a radially inward sidewall of the converging section and at a first acute angle relative to the axial centerline.

7. The method of claim 6, wherein the flowing the drilling mud through the diverging section comprises flowing the drilling mud outwardly away from the axial centerline along a radially inward sidewall of the diverging section and at a second acute angle relative to the axial centerline.

8. A method for dispersing particles in a water-based drilling mud, the method comprising:

flowing the water-based drilling mud through a converging section of a liquid mixture nozzle to increase a velocity of the water-based drilling mud, the liquid mixture nozzle comprising a body defined by an elongated cylindrical surface, only a single inlet, only a single outlet, and the body extends between the single inlet and the single outlet;

flowing the water-based drilling mud through an orifice of the liquid mixture nozzle, wherein the orifice is located immediately downstream of the converging section;

flowing the water-based drilling mud through an intermediate section of the liquid mixture nozzle, the intermediate section having a constant cross-sectional area, wherein a cross-sectional area of the intermediate section is greater than a cross-sectional area of the orifice and less than a cross-sectional area of the converging section at the single inlet, and the intermediate section being positioned immediately downstream of and immediately adjacent to the orifice; and flowing the water-based drilling mud through a diverging section of the liquid mixture nozzle, thereby generating turbulence within the water-based drilling mud to enhance dispersing of particles within the water-based drilling mud, wherein the diverging section is located downstream of the intermediate section.

9. The method of claim 8, further comprising:

measuring a first pressure of the water-based drilling mud prior to flowing the water-based drilling mud through the converging section;

measuring a second pressure of the water-based drilling mud after flowing the water-based drilling mud through the diverging section; and adjusting a flow rate of the water-based drilling mud introduced to the converging section based on a difference between the second pressure and the first pressure.

10. The method of claim 9, wherein the adjusting the flow rate is conducted until a predetermined differential pressure is obtained.

11. The method of claim 10, wherein the flowing the water-based drilling mud through the orifice comprises flowing the water-based drilling mud through a narrow end of the converging section and into a first end of the intermediate section.

12. The method of claim 11, wherein the flowing the water-based drilling mud through the diverging section comprises flowing the water-based drilling mud through a second end of the intermediate section and into an end of the diverging section.

13. The method of claim 8, wherein the flowing the water-based drilling mud through the converging section comprises flowing the water-based drilling mud inwardly toward an axial centerline of the liquid mixture nozzle along a radially inward sidewall of the converging section and at a first acute angle relative to the axial centerline.

14. The method of claim 8, wherein the flowing the water-based drilling mud through the diverging section comprises flowing the water-based drilling mud outwardly away from an axial centerline along a radially inward sidewall of the diverging section and at a second acute angle relative to the axial centerline.

* * * * *